United States Patent
Hu et al.

(10) Patent No.: US 12,512,738 B2
(45) Date of Patent: Dec. 30, 2025

(54) ROTOR ASSEMBLY AND SELF-STARTING PERMANENT MAGNET SYNCHRONOUS RELUCTANCE MOTOR (71) Applicant: Gree Electric Appliances, Inc. of Zhuhai, Guangdong (CN)

(72) Inventors: Yusheng Hu, Zhuhai (CN); Bin Chen, Zhuhai (CN); Yong Xiao, Zhuhai (CN); Jinfei Shi, Zhuhai (CN); Xia Li, Zhuhai (CN); Zhidong Zhang, Zhuhai (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 229 days.

(21) Appl. No.: 18/266,333

(22) PCT Filed: Oct. 18, 2021

(86) PCT No.: PCT/CN2021/124325
§ 371 (c)(1),
(2) Date: Jun. 9, 2023

(87) PCT Pub. No.: WO2022/160782
PCT Pub. Date: Aug. 4, 2022

(65) Prior Publication Data
US 2024/0030793 A1      Jan. 25, 2024

(30) Foreign Application Priority Data
Jan. 26, 2021   (CN) .......................... 202110102655.X (51) Int. Cl.
*H02K 21/46*          (2006.01)

(52) U.S. Cl.
CPC ................................. *H02K 21/46* (2013.01)

(58) Field of Classification Search
CPC .... H02K 19/14; H02K 15/0012; H02K 1/265; H02K 1/246; H02K 1/276; H02K 1/2766; H02K 1/2773
See application file for complete search history.

(56) References Cited

U.S. PATENT DOCUMENTS

2006/0108888 A1*   5/2006  Jung ..................... H02K 1/246
                                                                    310/211
2010/0011806 A1    1/2010  Nam et al.
(Continued)

FOREIGN PATENT DOCUMENTS

CN    1726629 A    1/2006
CN    1889326 A    1/2007
(Continued)

OTHER PUBLICATIONS

CN-211830364-U machine translation Jun. 28, 2025.*
EP 21922373, Extended European Search Report, Mar. 27, 2024.

*Primary Examiner* — Leda T Pham
(74) *Attorney, Agent, or Firm* — The Webb Law Firm (57) ABSTRACT The present application provides a rotor assembly and a self-starting permanent magnet synchronous reluctance motor. The rotor assembly includes a rotor core, wherein on a cross section of the rotor core, the rotor core is provided with slit slots, q-axis squirrel cage slots and permanent magnets, the q-axis squirrel cage slots are disposed at two ends of the slit slots, the permanent magnets are disposed in the slit slots, the permanent magnet located at the innermost layer in a d-axis direction is at least asymmetrically disposed relative to a d-axis, and an offset direction of the permanent magnet located at the innermost layer relative to the d axis is consistent with a rotation direction of the rotor assembly.

19 Claims, 4 Drawing Sheets

(56) References Cited

U.S. PATENT DOCUMENTS

| | | |
|---|---|---|
| 2015/0145371 A1 | 5/2015 | Kim et al. |
| 2017/0222505 A1* | 8/2017 | Janjic ............... H02K 1/246 |
| 2018/0198356 A1 | 7/2018 | Gieras |
| 2018/0226848 A1* | 8/2018 | Kolehmainen ........ H02K 19/14 |
| 2019/0089216 A1 | 3/2019 | Sano et al. |
| 2020/0280224 A1 | 9/2020 | Huang et al. |

FOREIGN PATENT DOCUMENTS

| | | | |
|---|---|---|---|
| CN | 101087079 A | 12/2007 | |
| CN | 102761187 A | 10/2012 | |
| CN | 105449894 A | 3/2016 | |
| CN | 107994698 A | 5/2018 | |
| CN | 109494903 A | 3/2019 | |
| CN | 109510347 A | 3/2019 | |
| CN | 109638998 A | 4/2019 | |
| CN | 211830364 U * | 10/2020 | |
| CN | 112186921 A | 1/2021 | |
| CN | 112968552 A | 6/2021 | |
| EP | 3672026 A1 * | 6/2020 | ............. H02K 1/22 |
| JP | H09271151 A | 10/1997 | |
| JP | 2006223052 A | 8/2006 | |
| WO | WO-2018083639 A1 * | 5/2018 | ............. H02K 19/14 |
| WO | 2019114799 A1 | 6/2019 | |
| WO | 2019214223 A1 | 11/2019 | |

* cited by examiner

ROTOR ASSEMBLY AND SELF-STARTING PERMANENT MAGNET SYNCHRONOUS RELUCTANCE MOTOR

CROSS-REFERENCE TO RELATED APPLICATIONS

This application is the United States national phase of International Application No. PCT/CN2021/124325 filed Oct. 18, 2021, and claims priority to Chinese Patent Application No. 202110102655.X, filed Jan. 26, 2021, the disclosures of which are hereby incorporated by reference in their entireties.

BACKGROUND OF THE INVENTION

Field of the Invention

The present application relates to the technical field of motors, in particular to a rotor assembly and a self-starting permanent magnet synchronous reluctance motor.

Description of Related Art

Self-starting permanent magnet synchronous reluctance motors combine the structural characteristics of induction motors and synchronous permanent magnet reluctance motors. A moment of force is generated by squirrel cage induction to realize starting, constant rotation speed operation is realized by the magnetic flux difference between a d axis and a q axis of a rotor and the torque generated by permanent magnets, and starting operation can be realized by directly connecting a power supply. The self-starting permanent magnet synchronous reluctance motor can improve a motor output torque by using a reluctance torque. Compared with a self-starting permanent magnet motor, the use amount of the permanent magnets is reduced and the cost is reduced. Compared with an asynchronous motor, the self-starting permanent magnet synchronous reluctance motor has high efficiency and a constant and synchronous rotation speed, which will not change with the change of a load.

For traditional permanent magnet motors and permanent magnet synchronous reluctance motors, drivers are required to start and control the operation, the cost is high, the control is complicated, and the drivers occupy part of the loss, which reduces the efficiency of the whole motor system.

The related art provides a self-starting permanent magnet synchronous reluctance motor to reduce the cost of the permanent magnets. However, the permanent magnets in the related art adopt long arc-shaped structures, which causes the magnetic flux at certain ends of the permanent magnets opposite to a rotation direction of the rotor to collide with a magnetic field of the rotor, resulting in the reduction of a utilization rate of the permanent magnets and the motor efficiency.

SUMMARY OF THE INVENTION

Therefore, the technical problem to be solved in the present application is to provide a rotor assembly and a self-starting permanent magnet synchronous reluctance motor, which can enable more magnetic flux of the permanent magnets to flow to one side of the rotation direction of the rotor assembly, improve the utilization rate of the permanent magnets and improve the motor efficiency.

In order to solve the above problem, the present application provides a rotor assembly, including a rotor core, wherein on a cross section of the rotor core, the rotor core is provided with slit slots, q-axis squirrel cage slots and permanent magnets, the q-axis squirrel cage slots are disposed at both ends of the slit slots, the permanent magnets are disposed in the slit slots, the permanent magnet located at the innermost layer in a d-axis direction is at least asymmetrically disposed relative to a d-axis, and an offset direction of the permanent magnet located at the innermost layer relative to the d axis is consistent with a rotation direction of the rotor assembly.

In some embodiments, at least two layers of permanent magnets are disposed in a radial direction, in the two adjacent layers of permanent magnets, the part of the permanent magnet located at the inner layer at a rear side of the d axis occupies a central angle a1 relative to a center of the rotor core, and the part of the permanent magnet located at the outer layer at the rear side of the d axis occupies a central angle a2 relative to the center of the rotor core, wherein $a1 \leq a2$. A front side of the d axis refers to a side of the d axis same as the rotation direction of the rotor assembly, and the rear side of the d axis refers to a side of the d axis opposite to the rotation direction of the rotor assembly.

In some embodiments, the rotor assembly is a 2-poles rotor structure.

In some embodiments, each layer of permanent magnets form a radially outward protruding structure, and each layer of permanent magnets include one or more arc-shaped or rectangular permanent magnets.

In some embodiments, a width of a magnetically permeable channel between the adjacent q-axis squirrel cage slots is greater than a minimum width of the magnetically permeable channel between the slit slots in the same layer.

In some embodiments, the rotor core is also provided with independent squirrel cage slots, under the same pole, the q-axis squirrel cage slots and the independent squirrel cage slots are alternately arranged in a circumferential direction, and a total width of the magnetically permeable channels on both sides of the independent squirrel cage slot is greater than the minimum width of the magnetically permeable channel.

In some embodiments, a magnetically permeable channel is formed between the adjacent slit slots, and a width of the magnetically permeable channel becomes smaller in a direction close to the d axis; and/or a magnetically permeable channel is formed between the adjacent slit slots, and the minimum width of the magnetically permeable channel is more than twice the minimum width of the slit slot adjacent to the magnetically permeable channel and located at the inner layer.

In some embodiments, the rotor core is also provided with independent squirrel cage slots, under the same pole, the q-axis squirrel cage slots and the independent squirrel cage slots are alternately arranged in the circumferential direction, extension directions of the q-axis squirrel cage slots and the independent squirrel cage slots are parallel to a q axis, and the q-axis squirrel cage slots and the independent squirrel cage slots are symmetrically distributed relative to the q axis or the d axis.

In some embodiments, an extension length of the q-axis squirrel cage slot is more than twice a width of the q-axis squirrel cage slot; and/or an extension length of the independent squirrel cage slot is more than twice a width of the independent squirrel cage slot.

In some embodiments, the rotor core is further provided with d-axis squirrel cage slots, and the d-axis squirrel cage slots are located on certain sides, close to a rotor excircle, of the permanent magnets on a radial outermost side in the d-axis direction.

In some embodiments, a plurality of d-axis squirrel cage slots are disposed, and are symmetrically distributed relative to the d axis or the q axis; and/or the d-axis squirrel cage slots extend in the d-axis direction.

In some embodiments, the slit slot includes an arc-shaped section and straight sections, the arc-shaped section protrudes outward in the radial direction, the straight sections are located at both ends of the arc-shaped section, and the permanent magnet is installed in the arc-shaped section and adaptive to the arc-shaped section in shape.

In some embodiments, the slit slot and the corresponding q-axis squirrel cage slots at both ends are combined to form a magnetic barrier layer, and two magnetic barrier layers are at least disposed in the radial direction of the rotor core.

In some embodiments, the rotor core is also provided with independent squirrel cage slots, under the same pole, the q-axis squirrel cage slots and the independent squirrel cage slots are alternately arranged in the circumferential direction, and at least certain edges of certain ends of at least part of the q-axis squirrel cage slots close to the rotor excircle are provided with cutting edges; and/or at least certain edges of certain ends of at least part of the independent squirrel cage slots close to the rotor excircle are provided with cutting edges.

In some embodiments, the rotor core is also provided with independent squirrel cage slots, under the same pole, the q-axis squirrel cage slots and the independent squirrel cage slots are alternately arranged in the circumferential direction, the width of a magnetic bridge between the independent squirrel cage slot and the rotor excircle is L61, and the width of a magnetic bridge between the q-axis squirrel cage slot and the rotor excircle is L62, wherein L61>L62; and/or the rotor core is also provided with d-axis squirrel cage slots, the d-axis squirrel cage slots are located on certain sides, close to the rotor excircle, of the permanent magnets on the radial outermost side in the d-axis direction, the width of a magnetic bridge between the d-axis squirrel cage slot and the rotor excircle is L63, and the width of the magnetic bridge between the q-axis squirrel cage slot and the rotor excircle is L62, wherein L63>L62.

In some embodiments, the rotor core is further provided with independent squirrel cage slots and d-axis squirrel cage slots, a total area of squirrel cage grooves formed by the q-axis squirrel cage slots, the d-axis squirrel cage slots and the independent squirrel cage slots is S1, a total area of the squirrel cage slots and the slit slots is S, and S1≥40% S.

In some embodiments, the rotor core is further provided with independent squirrel cage slots and d-axis squirrel cage slots, the q-axis squirrel cage slots, the d-axis squirrel cage slots and the independent squirrel cage slots are filled with conductive and magnetically impermeable materials, both ends of the rotor core are provided with end rings, and the q-axis squirrel cage slots, the d-axis squirrel cage slots and the independent squirrel cage slots are short-circuited through the end rings to form a squirrel cage structure.

In some embodiments, both ends of the rotor core are provided with magnetically impermeable baffles, and the magnetically impermeable baffles are disposed to shield the permanent magnets.

According to another aspect of the present application, a self-starting permanent magnet synchronous reluctance motor is provided and includes a stator and a rotor assembly, the rotor assembly being the above rotor assembly.

In some embodiments, the width of the magnetic bridge between the q-axis squirrel cage slot and the rotor excircle is L62, 0.5σ≤L62≤1.5σ, and σ is the radial width of an air gap between the stator and the rotor core.

The rotor assembly according to the present application includes the rotor core. On the cross section of the rotor core, the rotor core is provided with the slit slots, the q-axis squirrel cage slots and the permanent magnets. The q-axis squirrel cage slots are disposed at both ends of the slit slots, and the permanent magnets are disposed in the slit slots. The permanent magnet located at the innermost layer in the d-axis direction is at least asymmetrically disposed relative to the d axis, and the offset direction of the permanent magnet located at the innermost layer relative to the d axis is consistent with the rotation direction of the rotor assembly. Due to such a structure, the flow direction of magnetic flux generated by the offset permanent magnets more tends to a magnetic flux direction of the q axis of the rotor, more q-axis magnets are provided, and the problem of unbalanced magnetic flux of the permanent magnets caused since the magnetic flux of the permanent magnets is offset toward the rear side of the rotation direction of the rotor assembly under rotation of the rotor assembly is avoided, so that the magnetic flux located at the front side of the d axis is more consistent with the magnetic flux located at the rear side of the d axis, the utilization efficiency of the permanent magnets is improved and the motor efficiency is improved.

The reference signs are as follows:

1, rotor core; 2, slit slot; 21, arc-shaped section; 22, straight section; 3, permanent magnet; 4, squirrel cage slot; 41, q-axis squirrel cage slot; 42, independent squirrel cage slot; 43, d-axis squirrel cage slot; 5, shaft hole; 6, magnetic bridge; 7, cutting edge; 8, end ring; 9, magnetically impermeable baffle; 10, rivet.

DESCRIPTION OF THE INVENTION

In combination with and referring to FIGS. 1 to 7, according to an embodiment of the present application, the rotor assembly includes a rotor core 1. On a cross section of the rotor core 1, the rotor core 1 is provided with a shaft hole 5, slit slots 2, q-axis squirrel cage slots 41 and permanent magnets 3. The q-axis squirrel cage slots 41 are disposed at both ends of the slit slots 2, and the permanent magnets 3 are disposed in the slit slots 2. The permanent magnet 3 located at the innermost layer in a d-axis direction is at least disposed asymmetrically relative to a d axis, and an offset direction of the permanent magnet 3 located at the innermost layer relative to the d axis is consistent with a rotation direction of the rotor assembly.

Due to the structure, the flow direction of magnetic flux generated by the offset permanent magnets more tends to the magnetic flux direction of a q axis of a rotor, more q-axis magnets are provided, and the problem of unbalanced magnetic flux of the permanent magnets caused since the magnetic flux of the permanent magnets is offset toward the rear side of the rotation direction of the rotor assembly during rotation of the rotor assembly is avoided, so that the magnetic flux located at the front side of the d axis is more consistent with the magnetic flux located at the rear side of the d axis, the utilization efficiency of the permanent magnets is improved and the motor efficiency is improved. The front side of the d axis refers to a side of the d axis same as the rotation direction of the rotor assembly, and the rear side of the d axis refers to a side of the d axis opposite to the rotation direction of the rotor assembly.

In this embodiment, the offset direction of the permanent magnet 3 located at the innermost layer relative to the d axis is consistent with the rotation direction of the rotor assembly, which means that for the permanent magnet 3 located at the innermost layer, the use amount of the permanent magnet at the front side of the d axis is greater than the use amount of the permanent magnet at the rear side of the d axis. Specifically, for the permanent magnet 3 relative to the d axis, the length of the permanent magnet located at the front side of the d axis is greater than the length of the permanent magnet located at the rear side of the d axis, or the thickness of the permanent magnet located at the front side of the d axis is greater than the thickness of the permanent magnet located at the rear side of the d axis, etc. The purpose is to enable the magnetic flux of the permanent magnet 3 at the front side of the d axis to be greater than the magnetic flux of the permanent magnet 3 at the rear side of the d axis when the rotor assembly is not in operation, thereby reducing the magnetic flux offset caused by the rotation of the rotor assembly when the rotor assembly rotates, making the magnetic flux at both sides of the d axis as balanced as possible, improving the utilization rate of the permanent magnets and improving the efficiency of the motor.

Figure 2:
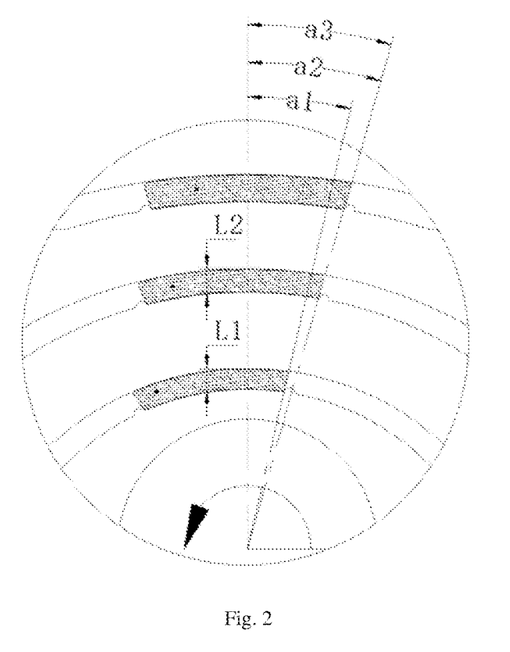
FIG. 2 is a partially enlarged structural schematic diagram of a rotor assembly according to an embodiment of the present application.

As shown in FIG. 2, at least two layers of permanent magnets 3 are disposed in the radial direction. In the two adjacent layers of permanent magnets 3, the part of the permanent magnet 3 located at the inner layer at the rear side of the d axis occupies a central angle a1 relative to a center of the rotor core 1, the part of the permanent magnet 3 located at the outer layer at the rear side of the d axis occupies a central angle a2 relative to the center of the rotor core, wherein a1≤a2. Therefore, more q-axis flux linkages can be generated by the permanent magnets 3 at the inner layer, which further increases the motor efficiency and also enables the permanent magnets 3 to be more fully used.

By taking three layers of permanent magnets 3 disposed in the radial direction as an example, the part of the permanent magnet 3 located at the outmost layer at the rear side of the d axis occupies a central angle a3 relative to the center of the rotor core 1, the part of the permanent magnet 3 located at the middle layer at the rear side of the d axis occupies the central angle a2 relative to the center of the rotor core 1, the part of the permanent magnet 3 located at the innermost layer at the rear side of the d axis occupies the central angle a1, and a1≤a2≤a3. The permanent magnets 3 take the d axis as a dividing line. In the rotation direction of the rotor assembly, the connecting line between the end point of one end of the permanent magnet 3 located at the rear side of the d axis away from the d axis and the center of the rotor core 1 is taken as a first connecting line, and the included angle formed between the first connecting line and the d axis is the central angle occupied by the part of the permanent magnet 3 at the rear side of the d axis relative to the center of the rotor core 1.

In this embodiment, in the radial outward direction, the ratio that the permanent magnet 3 is offset toward the front side of the d axis becomes smaller and smaller.

In one embodiment, the permanent magnets 3 located at the middle layer and the innermost layer are both offset toward the front side of the d axis, and the permanent magnet 3 located at the radial outermost side is symmetrical about the d axis.

In some embodiments, the rotor assembly is a 2-poles rotor structure.

For the motor, the moment of force generated by a magnetic field of the permanent magnet located at the inner layer and the magnetic field of a stator is greater, which has a greater impact on performances of the motor. Therefore, it is only necessary to ensure the maximum offset of the permanent magnet located at the innermost layer to ensure the maximum improvement on the performances of the motor and maximum optimization of the structure.

In some embodiments, when three layers of permanent magnets 3 are disposed in the radial direction, only the permanent magnet 3 located at the radial innermost layer may be offset, and the permanent magnets 3 located at the middle layer and the outermost layer are symmetrical about the d axis.

Each layer of permanent magnets 3 form a radially outward protruding structure, and each layer of permanent magnets 3 include one or more arc-shaped or rectangular permanent magnets.

Figure 3:
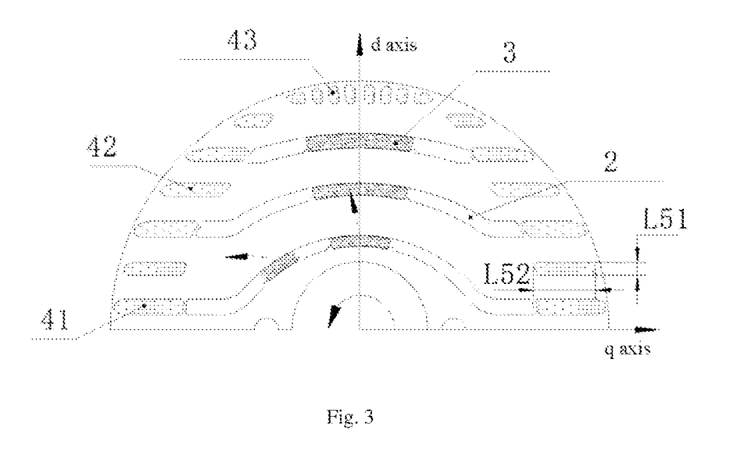
FIG. 3 is a schematic structural diagram of a rotor assembly according to an embodiment of the present application.
Figure 4:
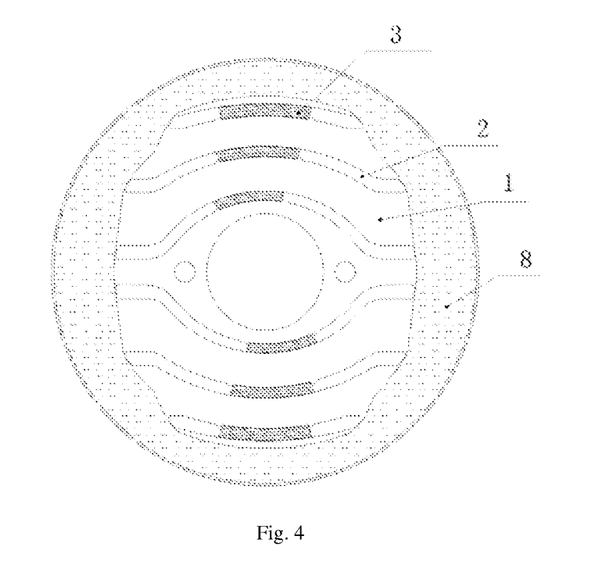
FIG. 4 is an axial view of a rotor assembly according to an embodiment of the present application.

When a layer of permanent magnets 3 include a plurality of permanent magnets, the offset can be realized by offsetting part of the permanent magnets 3, as shown in FIG. 3, in the permanent magnets located at the innermost layer, one permanent magnet 3 is located at the front side of the d axis, and another permanent magnet 3 is symmetrical about the d axis, thereby realizing the offset of the permanent magnets 3 at the front side of the d axis. In this structure, since the permanent magnets 3 adopt block structures, the design is more flexible, and arrangement positions of the permanent magnets 3 can be set more reasonably.

In some embodiments, the width of a magnetically permeable channel between the adjacent q-axis squirrel cage slots 41 is greater than the minimum width of the magnetically permeable channel between the slit slots 2 in the same layer.

The rotor core 1 is also provided with independent squirrel cage slots 42. Under the same pole, the q-axis squirrel cage slots 41 and the independent squirrel cage slots 42 are alternately arranged in the circumferential direction, and the total width of the magnetically permeable channels on both sides of the independent squirrel cage slot 42 is greater than the minimum width of the magnetically permeable channel.

Figure 1:
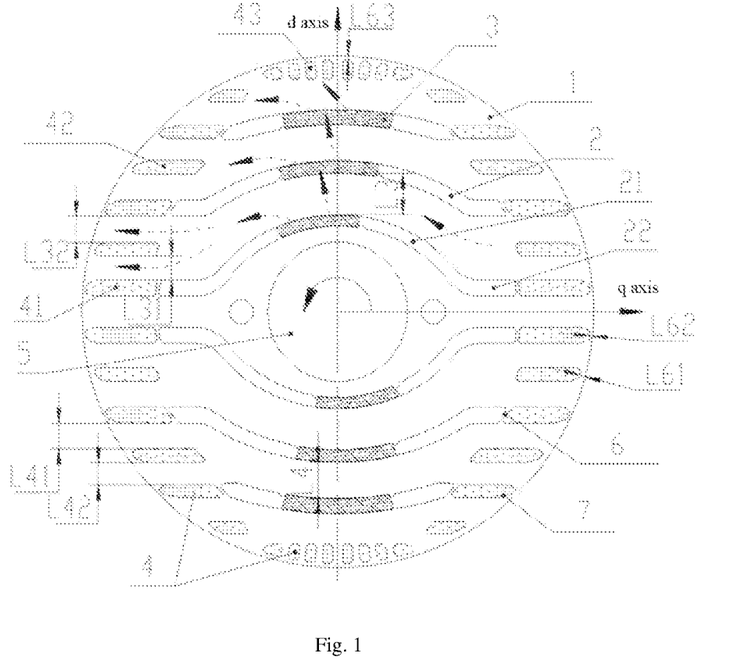
FIG. 1 is a schematic structural diagram of a rotor assembly according to an embodiment of the present application.

As shown in FIG. 1, by taking three layers of permanent magnets 3 disposed in the radial direction as an example, the independent squirrel cage slots 42 are disposed between the adjacent q-axis squirrel cage slots 41, the widths of the magnetically permeable channels on both sides of the independent squirrel cage slot 42 located at the inner layer are L31 and L32, the minimum width of the magnetically permeable channel located at the inner layer is L3, the widths of the magnetically permeable channels on both sides of the independent squirrel cage slot 42 located at the outer layer are L41 and L42, the minimum width of the magnetically permeable channel located at the outer layer is L4, L31+L32>L3, and L41+L42>L4.

The magnetically permeable channel is formed between the adjacent slit slots 2, and the width of the magnetically permeable channel becomes smaller in the direction close to the d axis.

The magnetically permeable channel is formed between the adjacent slit slots 2, and the minimum width of the magnetically permeable channel is more than twice the minimum width of the slit slot 2 adjacent to the magnetically permeable channel and located at the inner layer.

As shown in FIG. 1 and FIG. 3, by taking three layers of permanent magnets 3 disposed in the radial direction as an example, the minimum width of the magnetically permeable channel at the inner layer is L3, the minimum width of the slit slot 2 adjacent to the magnetically permeable channel at the inner layer and located at the inner side is L1, the minimum width of the magnetically permeable channel at the outer layer is L4, and the minimum width of the slit slot 2 adjacent to the magnetically permeable channel at the outer layer and located at the inner side is L2, wherein L3>2×L1 and L4>2×L2. Through the above design, saturation of the magnetically permeable channel between squirrel cage slots 4 or the slit slots 2 can be avoided, the influence of the squirrel cage slots 4 on the q-axis magnetic flux is reduced, and the output torque and efficiency of the motor are improved.

The rotor core 1 is also provided with independent squirrel cage slots 42. Under the same pole, the q-axis squirrel cage slots 41 and independent squirrel cage slots 42 are alternately arranged in the circumferential direction, and extension directions of the q-axis squirrel cage slots 41 and independent squirrel cage slots 42 are parallel to the q axis, so that the q-axis squirrel cage slots 41 can be matched with the slit slots 2 to form smooth magnetically permeable channels of the rotor. The q-axis squirrel cage slots 41 and the independent squirrel cage slots 42 are symmetrically distributed relative to the q axis or d axis.

An extension length of the q-axis squirrel cage slot 41 is more than twice the width thereof; and/or, an extension length of the independent squirrel cage slot 42 is more than twice the width thereof.

As shown in FIG. 3, by taking the independent squirrel cage slot 42 as an example, the extension length thereof in the q-axis direction is L52, the width is L51, and L52>2×L51. Under the condition of an unsaturation magnetic field, the squirrel cage slot adopts a slender structure to place more squirrel cage slot squirrel cages, thereby improving starting performances of the motor. The longer squirrel cage slot can increase an area of the squirrel cage slot and reduce a resistance of the squirrel cage slot, which further improves the starting performances and ensures a synchronous starting capacity of the motor.

The rotor core 1 is also provided with d-axis squirrel cage slots 43, and the d-axis squirrel cage slots 43 are located on certain sides, close to a rotor excircle, of the permanent magnets 3 on the radial outermost side in the d-axis direction.

There are a plurality of d-axis squirrel cage slots 43, which are symmetrically distributed relative to the d axis or q axis; and/or the d-axis squirrel cage slots 43 extend in the d-axis direction.

The d-axis squirrel cage slots 43 extend in the direction parallel to the d axis, which can avoid the phenomenon of magnetic saturation caused by gradually decreased widths of the d-axis squirrel cage slots 43 in the direction close to the rotor excircle. At the same time, a plurality of magnetically permeable channels are formed between the d-axis squirrel cage slots 43, which is convenient for passing of magnetic lines and improves output of the motor.

As shown in FIG. 1, in some embodiments, the slit slot 2 includes an arc-shaped section 21 and a straight section 22. The arc-shaped section 21 protrudes outward in the radial direction, and the straight sections 22 are located at both ends of the arc-shaped section 21. The permanent magnet 3 is installed in the arc-shaped section 21 and adapted to the shape of the arc-shaped section 21. Each layer of permanent magnets 3 include one or more permanent magnets, a rotor space can be effectively utilized to arrange the slit slots 2 and the permanent magnets 3 and a material utilization rate of the motor is improved.

In one embodiment, each layer of slit slot 2 may also be formed by combining a plurality of straight sections, and the overall shape of each layer of permanent magnets 3 protrudes radially outward in the d-axis direction.

The slit slot 2 and the corresponding q-axis squirrel cage slots 41 at two ends of the slit slot 2 are combined to form a magnetic barrier layer, and the number of the magnetic barrier layers in the radial direction of the rotor core is at least two or more; a certain number of magnetic barriers are formed on the rotor core 1, which can ensure a certain salient pole difference, increase a reluctance torque of the motor and improve the output capacity and efficiency of the motor.

The rotor core 1 is also provided with independent squirrel cage slots 42. Under the same pole, the q-axis squirrel cage slots 41 and the independent squirrel cage slots 42 are alternately arranged in the circumferential direction, and at least certain edges of certain ends of at least part of the q-axis squirrel cage slots 41 close to the rotor excircle are provided with cutting edges 7.

At least certain edges of certain ends of at least part of the independent squirrel cage slots 42 close to the rotor excircle are provided with cutting edges 7. The cutting edges 7 can effectively reduce sudden change of inductance, so that the magnetic flux is in slow transition, the magnetic field fluctuation is reduced, and harmonic waves and torque ripples of the motor are reduced.

In one embodiment, both sides of certain ends of the q-axis squirrel cage slots 41 and independent squirrel cage slots 42 close to the rotor excircle are provided with the cutting edges 7.

The rotor core 1 is also provided with independent squirrel cage slots 42. Under the same pole, the q-axis squirrel cage slots 41 and the independent squirrel cage slots 42 are alternately arranged in the circumferential direction. The width of a magnetic bridge 6 between the independent squirrel cage slot 42 and the rotor excircle is L61, and the width of a magnetic bridge 6 between the q-axis squirrel cage slot 41 and the rotor excircle is L62, wherein L61>L62, so that the width of the magnetic bridge 6 between the independent squirrel cage slot 42, not matched and connected with the permanent magnet 3, and the rotor excircle can be properly enlarged to reduce the harmonic waves of the motor and improve the starting performances of the motor.

In one embodiment, the rotor core 1 is also provided with d-axis squirrel cage slots 43, the d-axis squirrel cage slots 43 are located on certain sides, close to the rotor excircle, of the permanent magnets 3 on the radial outermost side in the d-axis direction. The width of a magnetic bridge 6 between the d-axis squirrel cage slot 43 and the rotor excircle is L63, and the width of the magnetic bridge 6 between the q-axis squirrel cage slot 41 and the rotor excircle is L62, wherein L63>L62.

The rotor core 1 is also provided with independent squirrel cage slots 42 and d-axis squirrel cage slots 43. The total area of the squirrel cage slots 4 formed by the q-axis squirrel cage slots 41, the d-axis squirrel cage slots 43 and the independent squirrel cage slots 42 is S1, the total area of the squirrel cage slots 4 and the slit slots 2 is S, and S1≥40% S. In some embodiments, 0.5×S<S1<0.7×S, which can ensure a certain number of areas and improve the synchronization capacity of the motor.

Figure 6:
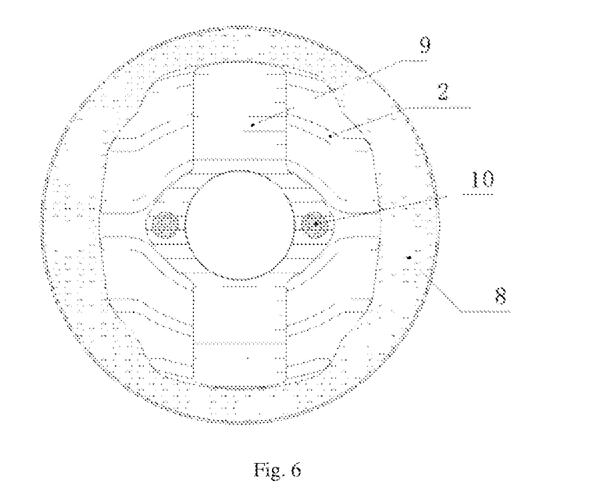
FIG. 6 is an axial view of a rotor assembly according to an embodiment of the present application.

As shown in FIG. 6, the rotor core 1 is also provided with independent squirrel cage slots 42 and d-axis squirrel cage slots 43. The q-axis squirrel cage slots 41, the d-axis squirrel cage slots 43 and the independent squirrel cage slots 42 form the squirrel cage slots 4 arranged in the circumferential direction of the rotor core 1 together, and the squirrel cage slots 4 are filled with conductive and magnetically impermeable materials, such as aluminum or aluminum alloy. Both ends of the rotor core 1 are provided with end rings 8, and the q-axis squirrel cage slots 41, the d-axis squirrel cage slots 43 and the independent squirrel cage slots 42 are short-circuited through the end rings 8 to form a squirrel cage structure. A material of the end rings is the same as the filling material in the squirrel cage slot 4. The squirrel cage structure short-circuited per se provides an asynchronous torque in a starting stage of the motor to realize self-starting of the motor. The rotor multi-layer permanent magnetic barrier structure formed by the slit slots 2, the squirrel cage slots 4 and the permanent magnets 3 provides a permanent magnet torque and a reluctance torque for the motor to realize synchronous operation of the motor.

Figure 5:
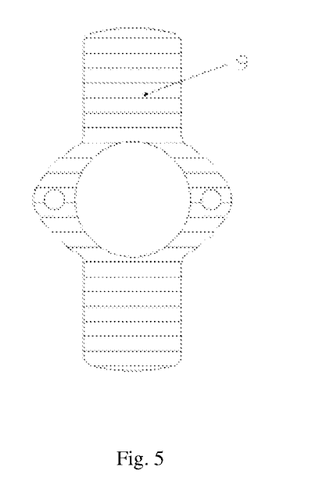
FIG. 5 is a schematic structural diagram of magnetically impermeable baffles of a rotor assembly according to an embodiment of the present application.

Both ends of the rotor core 1 are provided with magnetically impermeable baffles 9, and the magnetically impermeable baffles 9 can shield the permanent magnets 3, but not all the slit slots 2. The magnetically impermeable baffles 9 can fix both ends of the permanent magnets 3 in the axial direction of the rotor core 1, and the unshielded parts of the slit slots 2 can form through holes in the axial direction of the rotor core 1, which is favorable for air or a refrigerant to flow, improve heat dissipation of the rotor and improve the efficiency of the motor.

The rotor core 1 is also provided with rivet holes, and the rotor assembly tightly compresses the magnetically impermeable baffles 9 at both ends of the rotor core 1 in the axial direction through rivets 10, thereby forming the rotor assembly.

The shaft hole 5 may be circular, oval or rectangular.

Figure 7:
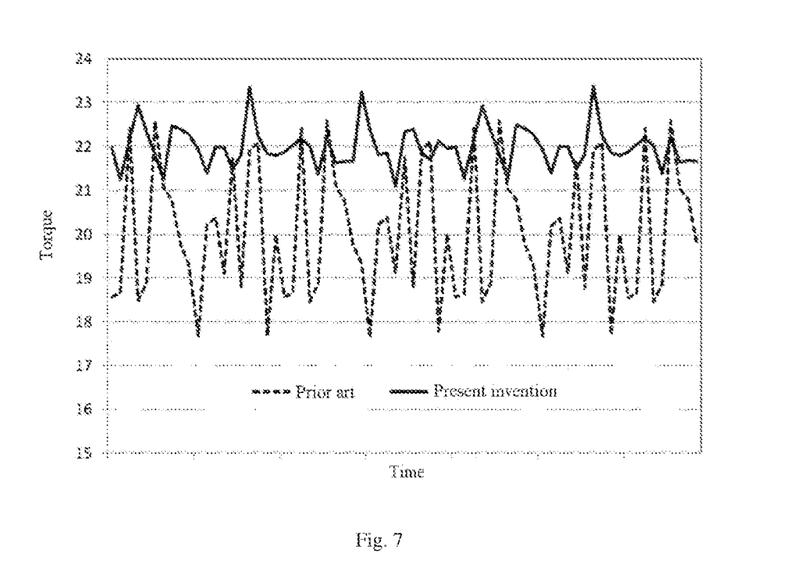
FIG. 7 is a comparison diagram of torque curves between a motor according to an embodiment of the present application and a motor in the related art.

In combination with and referring to FIG. 7, which is a comparison diagram of the torque curves of the motor in the embodiment of the present application and the motor in the related art, it can be seen from FIG. 7 that under the same stator and current, the torque of the motor adopting the solution of the embodiment of the present application is improved, the values of torque peaks and torque ripples are reduced, and better effects can be achieved.

According to an embodiment of the present application, the self-starting permanent magnet synchronous reluctance motor includes a stator and a rotor assembly, and the rotor assembly is the above rotor assembly.

In one embodiment, the width of the magnetic bridge 6 between the q-axis squirrel cage slot 41 and the rotor excircle is L62, and 0.5σ≤L62≤1.5σ, wherein σ is the radial width of an air gap between the stator and the rotor core 1, so that the magnetic bridge 6 between the q-axis squirrel cage slot 41 and the rotor excircle can have a suitable width, and magnetic leakage can be reduced as much as possible while a mechanical strength of the rotor assembly is ensured.

It is easily understood by those skilled in the art that the above various favorable ways can be freely combined and superimposed without conflict.

The foregoing is only preferred embodiments of the present application, and not intended to limit the present application. Any modifications, equivalent substitutions and improvements made within the spirit and principles of the present application should be included in the scope of protection of the present application. The foregoing is only the preferred embodiments of the present application. It should be pointed out that for those ordinary skilled in the art, several improvements and transformations can be made without departing from the technical principles of the present application. These improvements and transformations should also be regarded as the scope of protection of the present application.

The invention claimed is:

1. A rotor assembly, comprising a rotor core, wherein on a cross section of the rotor core, the rotor core is provided with slit slots, q-axis squirrel cage slots and permanent magnets, the q-axis squirrel cage slots are disposed at both ends of the slit slots, the permanent magnets are disposed in the slit slots, the permanent magnet located at the innermost layer in a d-axis direction is at least asymmetrically disposed relative to a d-axis, and an offset direction of the permanent magnet located at the innermost layer relative to the d axis is consistent with a rotation direction of the rotor assembly:
   wherein at least two layers of permanent magnets are disposed in a radial direction, in the two adjacent layers of the permanent magnets, the part of the permanent magnet located at an inner layer at a rear side of the d axis has a central angle a1 relative to a center of the rotor core, and the part of the permanent magnet located at the outer layer at the rear side of the d axis has a central angle a2 relative to the center of the rotor core, wherein a1≤a2; and
   a front side of the d axis refers to a side of the d axis same as the rotation direction of the rotor assembly, and the rear side of the d axis refers to a side of the d axis opposite to the rotation direction of the rotor assembly.

2. The rotor assembly according to claim 1, wherein the rotor assembly is a 2-poles rotor structure.

3. The rotor assembly according to claim 1, wherein each layer of permanent magnets form a radially outward protruding structure, and each layer of permanent magnets comprise one or more arc-shaped or rectangular permanent magnets.

4. The rotor assembly according to claim 1, wherein a width of a magnetically permeable channel between the adjacent q-axis squirrel cage slots is greater than a minimum width of the magnetically permeable channel between the slit slots in the same layer.

5. The rotor assembly according to claim 4, wherein the rotor core is also provided with independent squirrel cage slots, under the same pole, the q-axis squirrel cage slots and the independent squirrel cage slots are alternately arranged in a circumferential direction, and a total width of the magnetically permeable channels on both sides of the independent squirrel cage slot is greater than the minimum width of the magnetically permeable channel.

6. The rotor assembly according to claim 1, wherein a magnetically permeable channel is formed between the adjacent slit slots, and a width of the magnetically permeable channel becomes smaller in a direction close to the d axis; and/or a magnetically permeable channel is formed between the adjacent slit slots, and the minimum width of the magnetically permeable channel is more than twice the minimum width of the slit slot adjacent to the magnetically permeable channel and located at the inner layer.

7. The rotor assembly according to claim 1, wherein the rotor core is also provided with independent squirrel cage slots, under the same pole, the q-axis squirrel cage slots and the independent squirrel cage slots are alternately arranged in the circumferential direction, extension directions of the q-axis squirrel cage slots and the independent squirrel cage slots are parallel to a q axis, and the q-axis squirrel cage slots and the independent squirrel cage slots are symmetrically distributed relative to the q axis or the d axis.

8. The rotor assembly according to claim 7, wherein an extension length of the q-axis squirrel cage slot is more than twice a width of the q-axis squirrel cage slot; and/or an extension length of the independent squirrel cage slot is more than twice a width of the independent squirrel cage slot.

9. The rotor assembly according to claim 1, wherein the rotor core is further provided with d-axis squirrel cage slots, and the d-axis squirrel cage slots are located on a side, close to a rotor excircle, of the permanent magnets on a radial outermost side in the d-axis direction.

10. The rotor assembly according to claim 9, wherein a plurality of d-axis squirrel cage slots are disposed, and are symmetrically distributed relative to the d axis or the q axis; and/or the d-axis squirrel cage slots extend in the d-axis direction.

11. The rotor assembly according to claim 1, wherein the slit slot comprises an arc-shaped section and straight sections, the arc-shaped section protrudes outward in the radial direction, the straight sections are located at both ends of the arc-shaped section, the permanent magnet is installed in the arc-shaped section and adaptive to the arc-shaped section in shape.

12. The rotor assembly according to claim 1, wherein the slit slot and the corresponding q-axis squirrel cage slots at both ends are combined to form a magnetic barrier layer, and two magnetic barrier layers are at least disposed in the radial direction of the rotor core.

13. The rotor assembly according to claim 1, wherein the rotor core is also provided with independent squirrel cage slots, under the same pole, the q-axis squirrel cage slots and the independent squirrel cage slots are alternately arranged in the circumferential direction, and at least certain edges of certain ends of at least part of the q-axis squirrel cage slots close to the rotor excircle are provided with cutting edges; and/or at least certain edges of certain ends of at least part of the independent squirrel cage slots close to the rotor excircle are provided with cutting edges.

14. The rotor assembly according to claim 1, wherein the rotor core is also provided with independent squirrel cage slots, under the same pole, the q-axis squirrel cage slots and the independent squirrel cage slots are alternately arranged in the circumferential direction, the width of a magnetic bridge between the independent squirrel cage slot and the rotor excircle is L61, and the width of a magnetic bridge between the q-axis squirrel cage slot and the rotor excircle is L62, wherein L61>L62; and/or the rotor core is also provided with d-axis squirrel cage slots, the d-axis squirrel cage slots are located on certain sides, close to the rotor excircle, of the permanent magnets on the radial outermost side in the d-axis direction, the width of a magnetic bridge between the d-axis squirrel cage slot and the rotor excircle is L63, and the width of the magnetic bridge between the q-axis squirrel cage slot and the rotor excircle is L62, wherein L63>L62.

15. The rotor assembly according to claim 1, wherein the rotor core is further provided with independent squirrel cage slots and d-axis squirrel cage slots, a total area of squirrel cage grooves formed by the q-axis squirrel cage slots, the d-axis squirrel cage slots and the independent squirrel cage slots is S1, a total area of the squirrel cage slots and the slit slots is S, and S1≥40% S.

16. The rotor assembly according to claim 1, wherein the rotor core is further provided with independent squirrel cage slots and d-axis squirrel cage slots, the q-axis squirrel cage slots, the d-axis squirrel cage slots and the independent squirrel cage slots are filled with conductive and magnetically impermeable materials, both ends of the rotor core are provided with end rings, and the q-axis squirrel cage slots, the d-axis squirrel cage slots and the independent squirrel cage slots are short-circuited through the end rings to form a squirrel cage structure.

17. The rotor assembly according to claim 1, wherein both ends of the rotor core are provided with magnetically impermeable baffles, and the magnetically impermeable baffles are disposed to shield the permanent magnets.

18. A self-starting permanent magnet synchronous reluctance motor, comprising a stator and a rotor assembly, wherein the rotor assembly is the rotor assembly according to claim 1.

19. The self-starting permanent magnet synchronous reluctance motor according to claim 18, wherein the width of the magnetic bridge between the q-axis squirrel cage slot and the rotor excircle is L62, 0.5σ≤L62≤1.5σ, and σ is the radial width of an air gap between the stator and the rotor core.

* * * * *